(12) United States Patent
Masser et al.

(10) Patent No.: US 8,660,621 B2
(45) Date of Patent: Feb. 25, 2014

(54) MOBILE PHONE

(75) Inventors: Paul Masser, Heidelberg (CA); Jason Tyler Griffin, Kitchener (CA); Jodie Elizabeth Fletcher, Ottawa (CA); Li Huang, Kitchener (CA); Neil Savio Pereira, Kitchener (CA); Timothy Herbert Kyowski, Kitchener (CA); Benjamin John Henley, London (GB); Joris Willem Beets, London (GB); Martin Riddiford, London (GB)

(73) Assignee: BlackBerry Limited, Waterloo (CA)

( * ) Notice: Subject to any disclaimer, the term of this patent is extended or adjusted under 35 U.S.C. 154(b) by 579 days.

(21) Appl. No.: 12/860,609

(22) Filed: Aug. 20, 2010

(65) Prior Publication Data

US 2012/0046076 A1  Feb. 23, 2012

(51) Int. Cl.
*H04M 1/00* (2006.01)
(52) U.S. Cl.
USPC ....................................... 455/575.3
(58) Field of Classification Search
USPC .................................... 455/575.3
See application file for complete search history.

(56) References Cited

U.S. PATENT DOCUMENTS

| | | | |
|---|---|---|---|
| 7,353,568 B2* | 4/2008 | Duan et al. | 16/330 |
| 2004/0008154 A1* | 1/2004 | Miyata et al. | 345/1.1 |
| 2004/0264118 A1 | 12/2004 | Karidis et al. | |
| 2008/0276423 A1* | 11/2008 | Wu | 16/277 |
| 2010/0304799 A1* | 12/2010 | Leung et al. | 455/575.3 |

FOREIGN PATENT DOCUMENTS

| | | |
|---|---|---|
| EP | 1939470 A1 | 7/2008 |
| EP | 2226991 A1 | 9/2010 |
| EP | 2161906 A1 | 3/2012 |
| JP | 2005-275964 A | 10/2005 |
| WO | 02/17051 A1 | 2/2002 |
| WO | 2006/120300 A1 | 11/2006 |
| WO | 2010/028394 A1 | 3/2010 |

\* cited by examiner

*Primary Examiner* — Charles Appiah
*Assistant Examiner* — Natasha Cosme
(74) *Attorney, Agent, or Firm* — Fitch, Even, Tabin & Flannery LLP

(57) ABSTRACT

A mobile device includes a first housing, a second housing, and a hinge assembly rotatably coupling the first housing to the second housing and enabling movement of the device between an open configuration and a closed configuration. When the device is in the open configuration, the first housing is planar with the second housing.

19 Claims, 16 Drawing Sheets

MOBILE PHONE

BACKGROUND OF THE DISCLOSURE

This disclosure is directed to personal communication devices, and more specifically to a hinge assembly for a mobile or handheld electronic device.

Mobile devices are well known and are utilized for both business and personal use. Conventional mobile communication devices are typically two-way communication devices that offer voice and data communication, such as email and text messaging. Additional features such as Internet browsing, navigation systems and calendar applications are also available on some conventional devices.

Conventional mobile devices can come in several form factors, such as candy bar, slider, and clamshell or flip-style. Clamshell devices typically include an upper housing, a lower housing and a hinge assembly that enables the upper housing to rotate relative to the lower housing for opening and closing of the device. When the device is in an open configuration, the upper and lower housings are typically offset from or overlap each other, with the upper housing being arranged at an oblique angle relative to the lower housing. Such a configuration can limit the size of the input devices provided on inner surfaces of the upper and lower housings. Specifically, due to the overlap of one of the housings onto the other of the housings, one of the input devices may need to be reduced in size to fit on the housing and not be obstructed by the overlapping housing. Further, due to the construction of some conventional hinge assemblies, when the device is in the open configuration, the upper and lower housings are separated by the hinge assembly such that an input device on the upper housing may not be able to extend onto the lower housing and vice versa.

DETAILED DESCRIPTION

Figure 1:
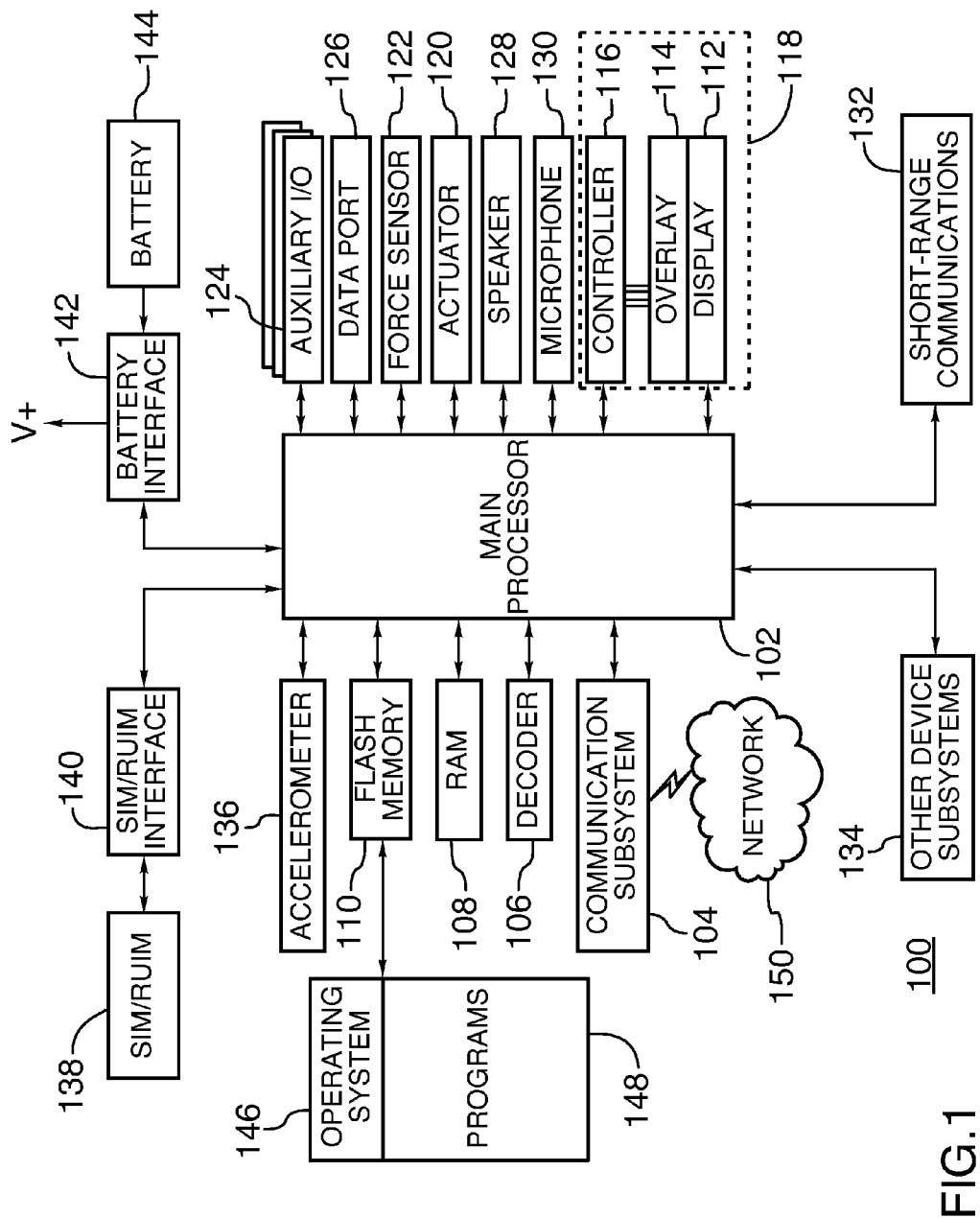
FIG. 1 is a block diagram showing the components of a mobile device in accordance with the present disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The mobile device can be a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIG. 1, which shows a simplified block diagram of components of a mobile device 100 according to one embodiment.

The device 100 includes multiple components such as a processor 102 that controls the operations of the device 100. Communication functions, including data communications, voice communications, or both may be performed through a communication subsystem 104. Data received by the device 100 is decompressed and decrypted by a decoder 106. The communication subsystem 104 may receive messages from and send messages to a wireless network 150.

The wireless network 150 may be any type of wireless network, including, but not limited to, data-centric wireless networks, voice-centric wireless networks, and dual-mode networks that support both voice and data communications.

The device 100 may be a battery-powered device and as shown includes a battery interface 142 for receiving one or more rechargeable batteries 144.

The processor 102 generally interacts with subsystems such as, for example, a Random Access Memory (RAM) 108, a flash memory 110, a display 112 (which may have a touch-sensitive overlay 114 connected to an electronic controller 116 that together comprise a touch-sensitive display 118), an actuator assembly such as a keyboard 120, one or more optional force sensors 122, an auxiliary input/output (I/O) subsystem 124, a data port 126, a speaker 128, a microphone 130, short-range communications 132 and other device subsystems 134.

User-interaction with the graphical user interface may be performed through the touch-sensitive overlay 114. The processor 102 interacts with the touch-sensitive overlay 114 via the electronic controller 116.

Information, such as text, characters, symbols, images, icons, and other items may be displayed or rendered on the touch-sensitive display 118 via the processor 102.

The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the device 100 may use a Subscriber Identity Module or a Removable User Identity Module (SIM/RUIM) card 138 inserted into a SIM/RUIM interface 140 for communication with a network, such as the wireless network 150.

Alternatively, user identification information may be programmed into the flash memory 110.

The device 100 also includes an operating system 146 and software components or programs 148 that are executed by the processor 102 and which may be stored in a persistent store such as the flash memory 110. Additional applications may be loaded onto the device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104.

For voice communications, the overall operation of the device 100 is similar. The speaker 128 outputs audible information converted from electrical signals, and the microphone 130 converts audible information into electrical signals for processing.

Figure 2:
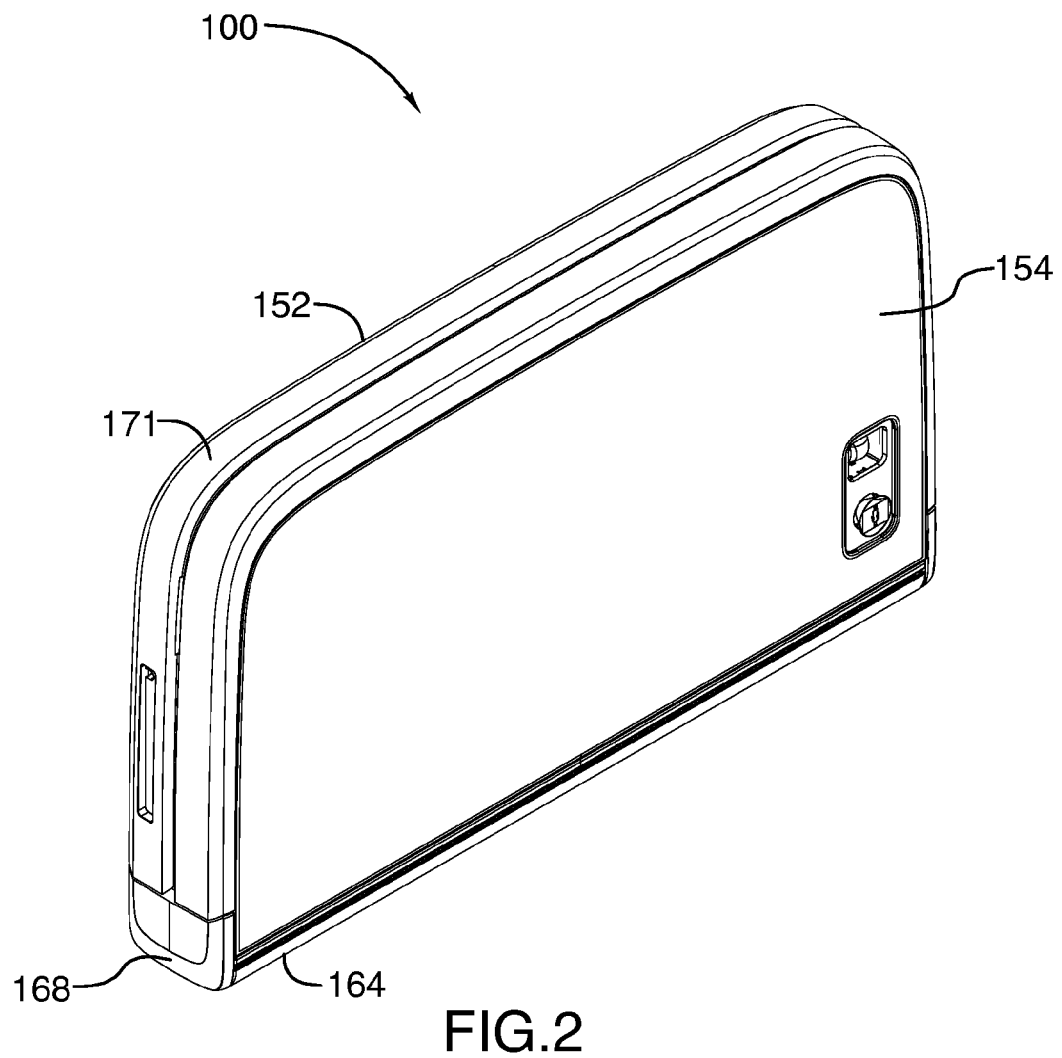
FIG. 2 is a back perspective view of the mobile device in a closed configuration.
Figure 3:
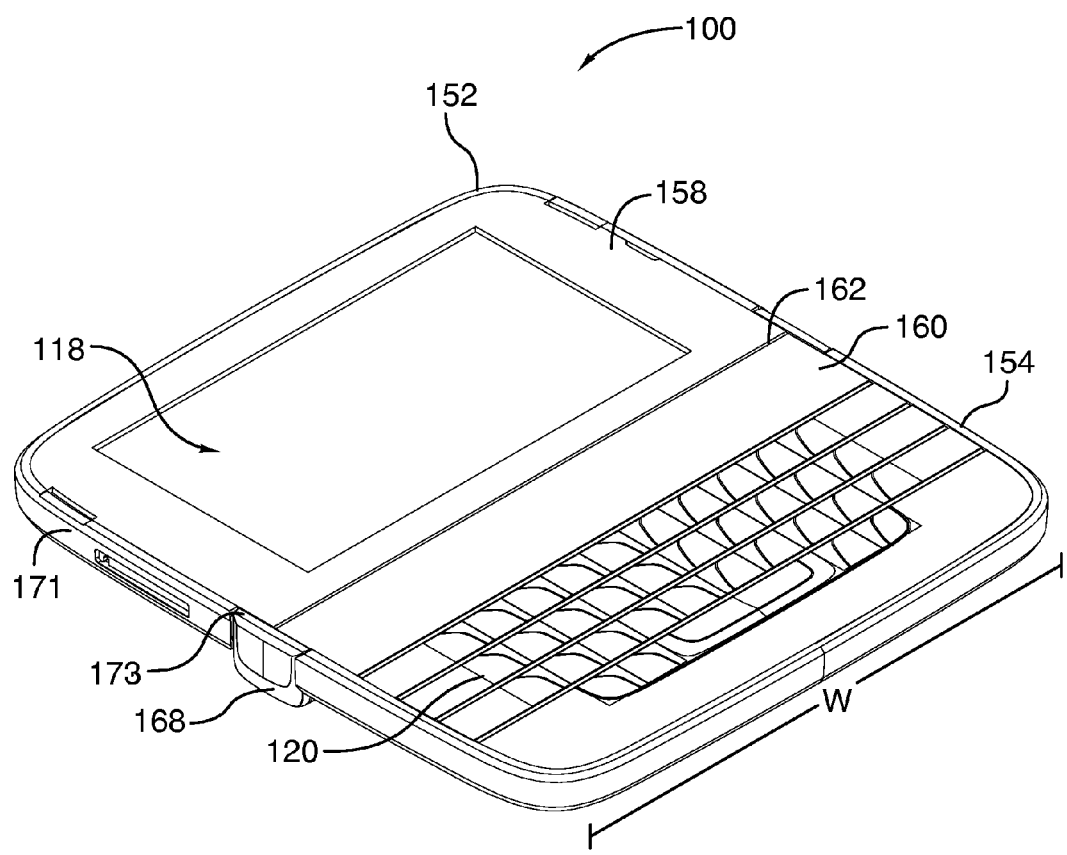
FIG. 3 is a front perspective view of the mobile device in an open configuration.

Referring next to FIGS. 2 and 3, the mobile device 100 may be a clamshell-type device configurable between a closed and an open configuration. The device 100 may include a first or upper housing 152 rotatably coupled to a second or lower housing 154 by a hinge assembly 156. The upper and lower housings 152, 154 rotate relative to each other between the closed (FIG. 2) and the open (FIG. 3) configurations such that when the device 100 is in the open configuration, the upper housing 152 is planar with the lower housing 154. More specifically and as will be described in further detail below, the hinge assembly 156 enables the device 100 to open and close similar to a book being opened and closed; from the closed configuration in FIG. 2, the upper and lower housings 152, 154 both rotate approximately 90° to provide a substantially flat and planar surface when the device is in the open configuration. As shown in FIG. 3, when the device 100 is in the open configuration, the upper housing 152 and lower housing 154 are planar to each other and define an approximately 180° angle relative to each other.

As seen in FIG. 3, the upper housing 152 can include an inner face 158 and the lower housing 154 can also include an inner face 160; each of the inner faces 158, 160 can include an input device. For example, the device 100 in FIG. 3 includes the touch sensitive display 118 provided on the upper housing inner face 158, and the keyboard 120 provided on the lower housing inner face 160. However, it is appreciated that the device 100 is not limited to such a configuration. For example, one or both of the inner faces 158, 160 could include a touch sensitive display, a non-touch LCD display, or could further include an auxiliary input device (not shown) such as an optical trackpad, trackball, joystick, and the like. Alternatively and as will be described in further detail below, a single touch-sensitive display could be provided that extends across the hinge assembly and onto both upper and lower housings (not shown), or one of the housings could include a display that extends onto the hinge assembly (also not shown). Further, an outer face (not shown) of the upper housing 152 could also include a display (not shown) or other input device for use when the device 100 is in the closed configuration.

When the device 100 is in the open configuration, the upper housing inner face 158 is arranged at approximately 180° relative to the lower housing inner face 160 such that the housings 152, 154 are arranged planar to each other. It is contemplated that this configuration provides more space for the input devices and therefore allows for larger sized input devices than those in conventional clamshell devices. Specifically, conventional clamshell devices typically include either an overlap between the upper and lower housings or a bulky hinge portion located between the upper and lower housings (i.e., a hinge portion that extends above the height of the upper and lower housings). Such a configuration can limit the space available on the housings for input devices such as keyboards, displays and navigation devices. Since the present device 100 does not include either an overlap or a bulky hinge portion separating the upper and lower housings, it is contemplated that the present device 100 can include larger sized input devices than those in conventional clamshell devices, or an input device that extends from one of the upper or lower housings onto the hinge portion, while maintaining an overall reduced size form factor.

A gap 162, best seen in FIG. 3, is defined between the upper and lower housings 152, 154, and is present whether the device 100 is in the open or the closed configurations. Although other dimensions may be appropriate, the gap 162 is approximately between 0.1 and 0.5 mm wide, and in the present device 100, the gap is approximately 0.3 mm wide. The gap 162 is designed such that it remains a constant width regardless of whether the device is open, closed, or transitioning between the open and closed configurations. It is contemplated that due to the relatively small size of the gap 162 and it's constant width, the device 100 could include displays 118 (not shown) on both the upper and lower housing inner faces 158, 160 that act as one, single display when the device is in the open configuration. Alternatively, the displays could be configured such that there is one single display that traverses the gap 162 and extends onto both the upper and lower housings 152, 154 (not shown). As will be described in further detail below, it is also contemplated that the gap 162 provides proper clearance for the upper and lower housings 152, 154 to transition between the open and closed configurations without contacting each other.

Figure 4:
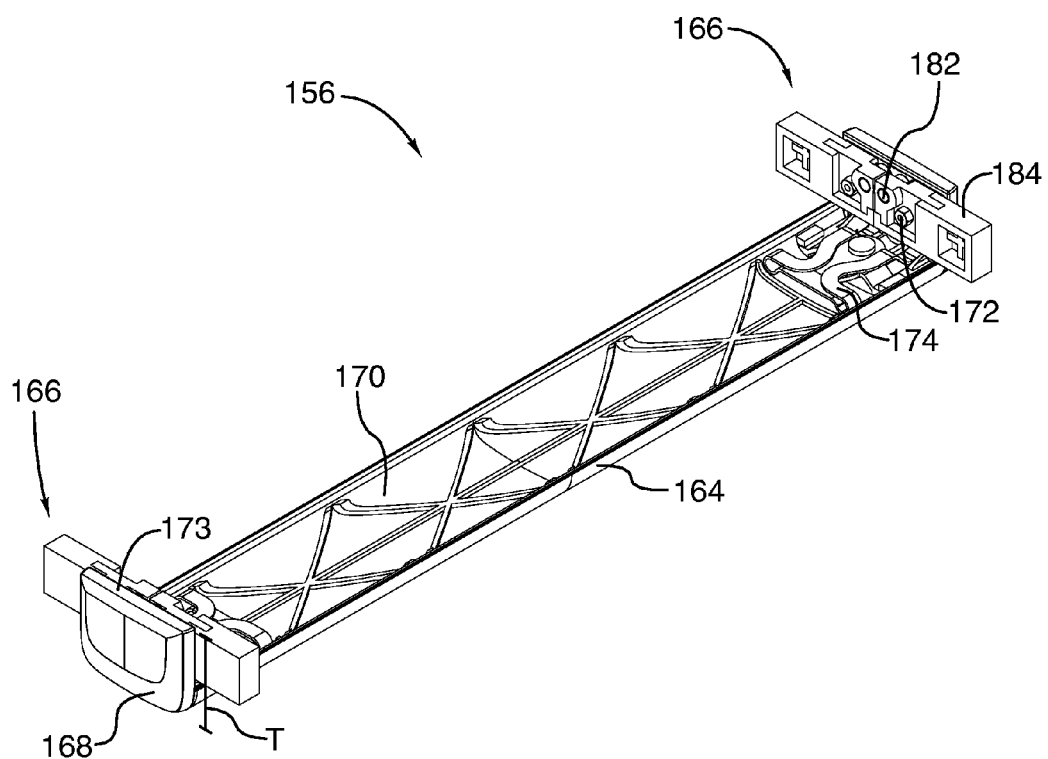
FIG. 4 is a front perspective view of a hinge assembly of the mobile device in the open configuration.

Referring next to FIG. 4, the hinge assembly 156 is configured for enabling opening and closing of the device 100, and includes a spine 164, at least one link mechanism 166 and a pair of end caps 168 provided on either end of the spine. The spine 164 extends along a width W of the device 100 and defines a channel 170 configured for receiving components of the link mechanism 166. As seen in FIG. 4, the present hinge assembly 156 includes a pair of link mechanisms 166, each of which include identical components, and accordingly, only one of the link mechanisms will be described herein. The link mechanism 166 is configured for engaging both the spine 164 and the respective end cap 168. In other words, the spine 164 and the end caps 168 are configured for enclosing the link mechanisms 166 and for providing a smooth external appearance to the hinge assembly 156.

In both the closed and the open configurations, the outer surfaces of the end caps 168 are substantially flush with sidewalls 171 of the device 100 (as seen in FIGS. 2 and 3), resulting in the device having a smooth outer surface. In addition, top corners 173 of the end caps 168 are substantially square or sharp, such that when the device 100 is in the open configuration, the corners 173 and top surface of the end caps are planar and flush with the inner surfaces 158, 160 of the upper and lower housings 152, 154. In the open configuration, the spine 164 has a thickness T that is greater than that of the upper and lower housings 152, 154, such that it can serve as a grip for a user's hands during use. Furthermore, if the user rests the device 100 on a flat or solid surface, the spine 164 serves as a base or rest for the device such that the device rests at a slightly acute angle relative to the solid surface. It is contemplated that such a resting arrangement enables the user to efficiently use the device for typing and/or viewing purposes.

Figure 5:
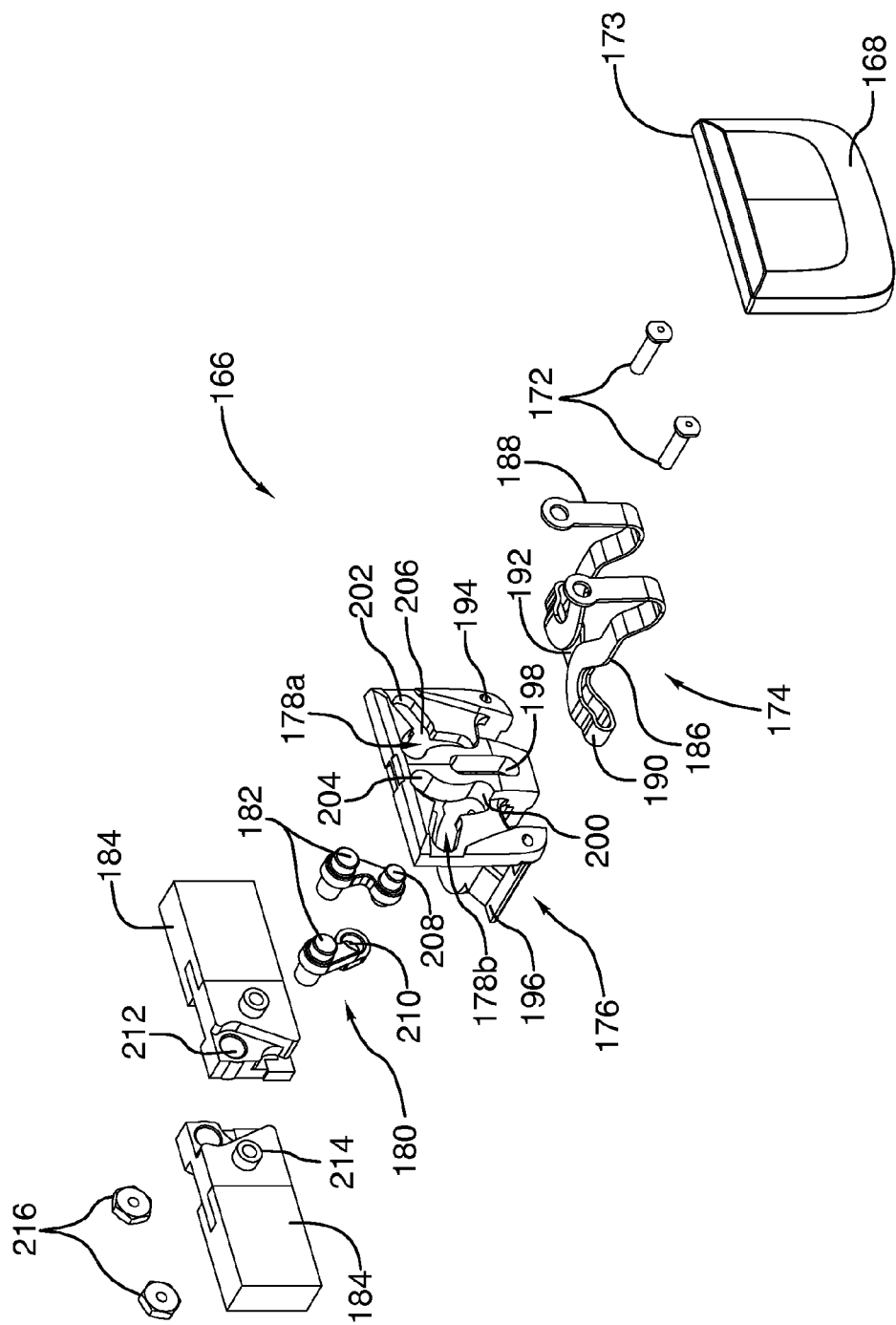
FIG. 5 is an exploded front perspective view of components of the hinge assembly.

Turning next to FIG. 5, each link mechanism 166 includes at least one pin 172, a biasing member 174, and a frame 176 defining at least one slot 178 (shown in the figures as a pair of slots 178a, 178b) configured for receiving a corresponding one of the pins. The link mechanism 166 further includes at least one link 180, each link including a link pin 182 configured for engaging and moving along a corresponding one of the slots 178a, 178b when the device 100 is moved between the closed and open configurations. Finally, the link mechanism 166 includes at least one arm 184, each arm configured for receiving a corresponding one of the links 180. In the present configuration, each link mechanism 166 includes a pair of links 180, and accordingly a pair of arms 184 is also provided. As will be described in further detail below, the link mechanism 166 is configured for enabling movement of the device 100 between the closed and open configurations.

In the present configuration, the biasing member 174 is an integrally formed spring configured for engaging the frame 176, and is retained between the end cap 168 and the frame 176. As seen in FIGS. 5-8, the spring 174 includes a base portion 186 that is substantially parallel to the spine 164. A pair of tabs 188 extends substantially perpendicularly from the base portion 186 and in a direction away from the spine 164. Each tab 188 defines a through hole for receiving one of the pins 172. The spring 174 further includes a pair of legs 190 that are substantially planar with the base portion 186 and that extend away from the base portion towards outer edges of the spine 164. The legs 190 have curved/rounded ends, and a bottom surface of the legs is configured to rest within the spine channel 170 (see FIG. 4). A bridge 192 joins the legs together, and is arranged substantially parallel to the base portion 186. Further, the bridge 192 is raised relative to the bottom surface of the legs 190 such that it does not directly contact the spine channel 170. It is contemplated that the shape of the spring 174 provides the spring with an increased strength and life when compared to conventional flat springs, which can fail early in their life cycles when subjected to both bending moment and torsion. Specifically, the raised bridge 192 and rounded ends of the legs 190 were designed such that when subjected to bending and torsion during opening and closing of the device 100, the maximum stress on the spring 174 is reduced and the life of the spring can be increased.

Still referring to FIG. 5, the frame 176 is configured to receive the spring 174. Specifically, the frame 176 includes a mounting portion 194 and a seat portion 196 arranged substantially perpendicular to the mounting portion. As briefly described above, the mounting portion 194 defines at least one slot 178 configured to receive a corresponding one of the pins 172. More specifically, the slot 178 includes the pair of generally Y-shaped slots 178a, 178b that are mirror images of each other and a link pin slot 198, each of which will be described in further detail below. The seat portion 196 is configured to engage and provide support to the base portion 186 of the spring 174 (see FIGS. 4 and 6, for example).

As indicated above, each link 180 includes a link pin 182 provided at an upper end of the link and having a first end configured to engage and move within a corresponding one of the slots 178a or 178b. Specifically, the slots 178a, 178b are substantially Y-shaped and each include a stem portion 200, a pair of fork portions 202 (also referred to herein as an outer fork portion) and 204 (also referred to herein as an inner fork portion) and an intersection portion 206 joining the stem and fork portions. A second end of the link pin 182 is configured for being received in a corresponding opening in the arm 184, as will be described in further detail below. To join the links 180 together, one of the links includes a rod 208 and the other of the links defines a cavity 210 configured for receiving one end of the rod. As can be seen from FIG. 5, the other end of the rod 208 is configured for engaging the link pin slot 198. As will be described with respect to FIGS. 6-8 below, the links 180 are configured for movement within the slots 178a, 178b, 198 during opening and closing of the device 100.

The arms 184 are each configured for attachment to a corresponding second end of one of the link pins 182, as seen in FIGS. 4-8. Although other configurations may be appropriate, the arms are substantially rectangular in cross-section, and define openings 212 at one end thereof for receiving the corresponding link pins 182. The arms 184 each further include a protrusion 214 configured for receiving a corresponding one of the pins 172 and for securing the spring 174, frame 176 and arms 184 together. To further retain the components of the link mechanism 166, a pair of nuts 216 can be secured to the pins 172 adjacent a front side of the corresponding arm 184. It is contemplated that instead of nuts 216, the components of the link mechanism 166 could be retained together by an alternative fastening mechanism, such as a welded pin/rivet (not shown), for example. The opposite end of each of the arms 184 is configured for attachment to one of the upper housing 152 and the lower housing 154, such that the arms 184 move during opening and closing of the device 100. Although not shown, the arms 184 can be attached to their respective housings by a screw-fit, for example. However, it is to be understood that the arms 184 could be attached to their respective housings by other means of attachment, such as by a snap fit, adhesion/glue or other known methods. In the present disclosure, the arms 184 are covered in a friction-reducing coating to enable the device 100 to open and close with ease. Further, to ensure antenna clearance is maintained, the arms 184 are manufactured from metal at a mechanism end (i.e., where the arms are part of and attached to components of the link mechanism), and are composed of a plastic material at a housing end (i.e., where the arms are attached to their respective housings).

Figure 6:
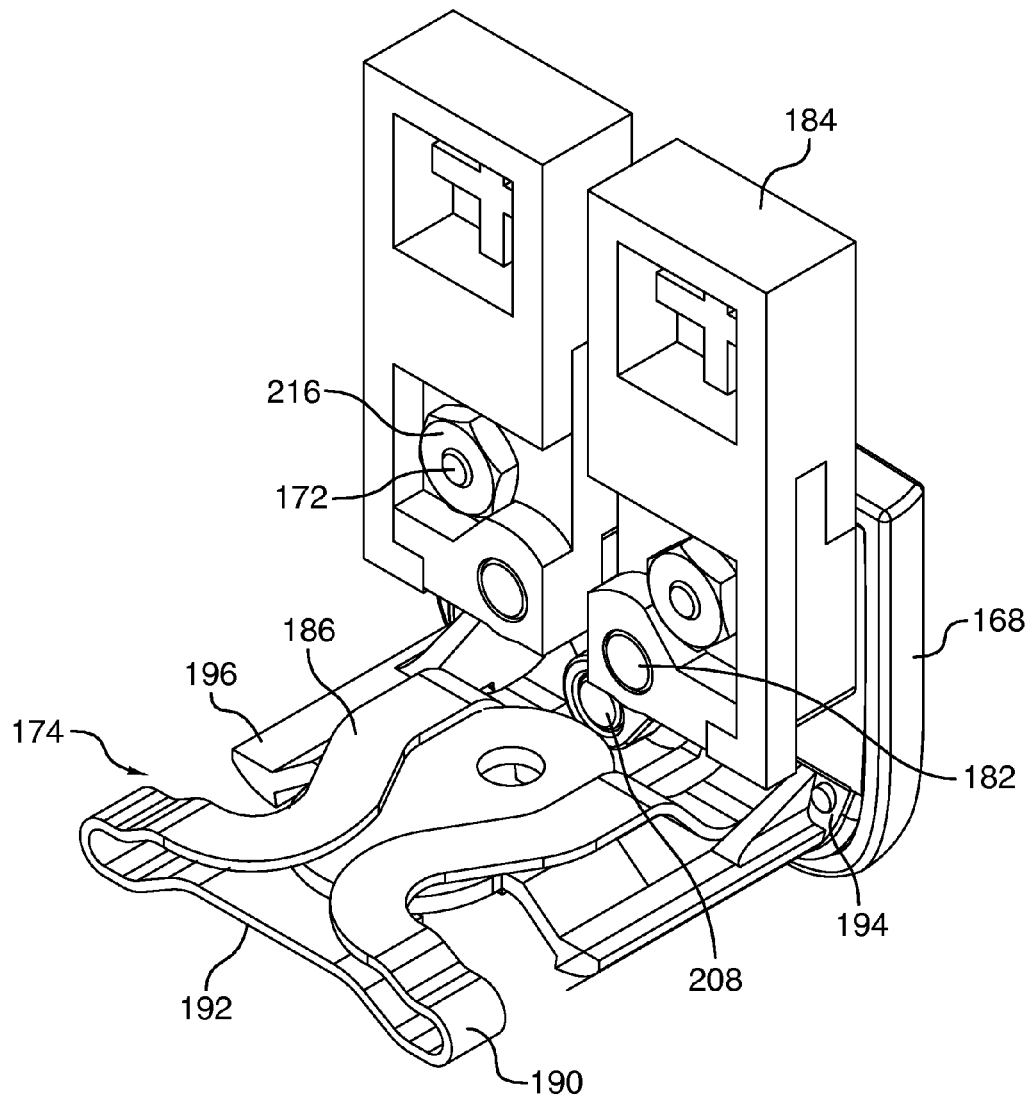
FIG. 6 is a side perspective view of the hinge assembly when the device is in the closed configuration.

Operation of the device 100 from the closed to the open configurations will now be described with reference to FIGS. 6-8. FIG. 6 shows the hinge assembly 156 in the closed configuration. As can be seen in the Figure, in the closed configuration the arms 184 are arranged substantially perpendicular to the spine 164 and frame seat portion 196. Further, in the closed configuration the rod 208 sits at the bottom end of the link pin slot 198, the link pins 182 are located at the bottom of the stem portion 200 of the corresponding frame slot 178a, 178b, and the pins 172 are located at the intersection portion 206 of the corresponding frame slot 178a, 178b. While in the closed configuration, corresponding inner faces 158, 160 of the upper and lower housings 152, 154 are adjacent to and facing each other (FIG. 2).

Figure 7:
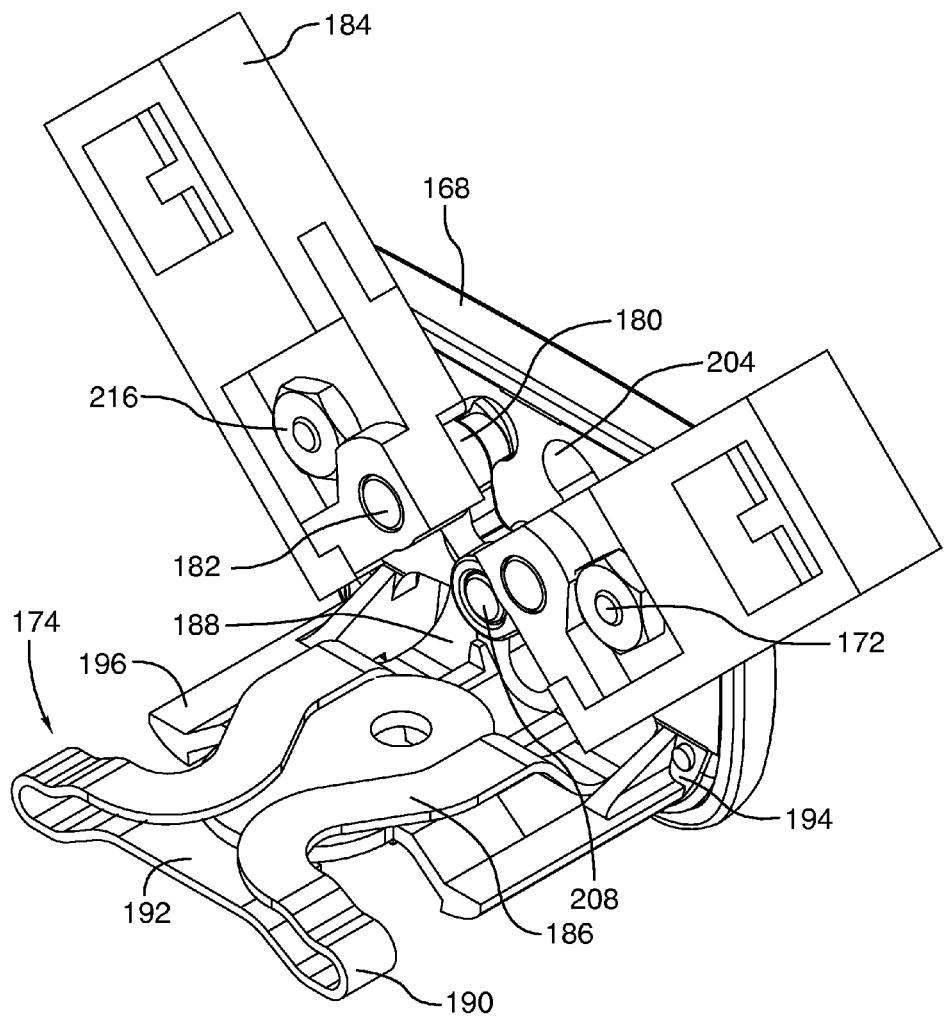
FIG. 7 is a front perspective view of the hinge assembly when the device is in a partially open configuration.

As the device 100 is opened, and as shown in FIG. 7, from an external viewpoint, the upper and lower housings 152, 154 move away from each other. With respect to the hinge assembly 156, when the device 100 is opened, the outward movement of the upper and lower housings 152, 154 causes the arms 184, which are each attached to one of the upper and lower housings, to move away from each other. This results in the rod 208 moving upward in the link pin slot 198 and the link pins 182 moving towards the inner fork portion 204 of the corresponding frame slot 178a, 178b. The tabs 188 bias the pins 172 slightly from the intersection portion 206 towards the outer fork portion 202 of the corresponding frame slot 178a, 178b. The movement of the rod 208, link pins 182 and pins 172 drive the arms 184, causing the upper and lower housings 152, 154 to move away from each other towards the open position.

Figure 8:
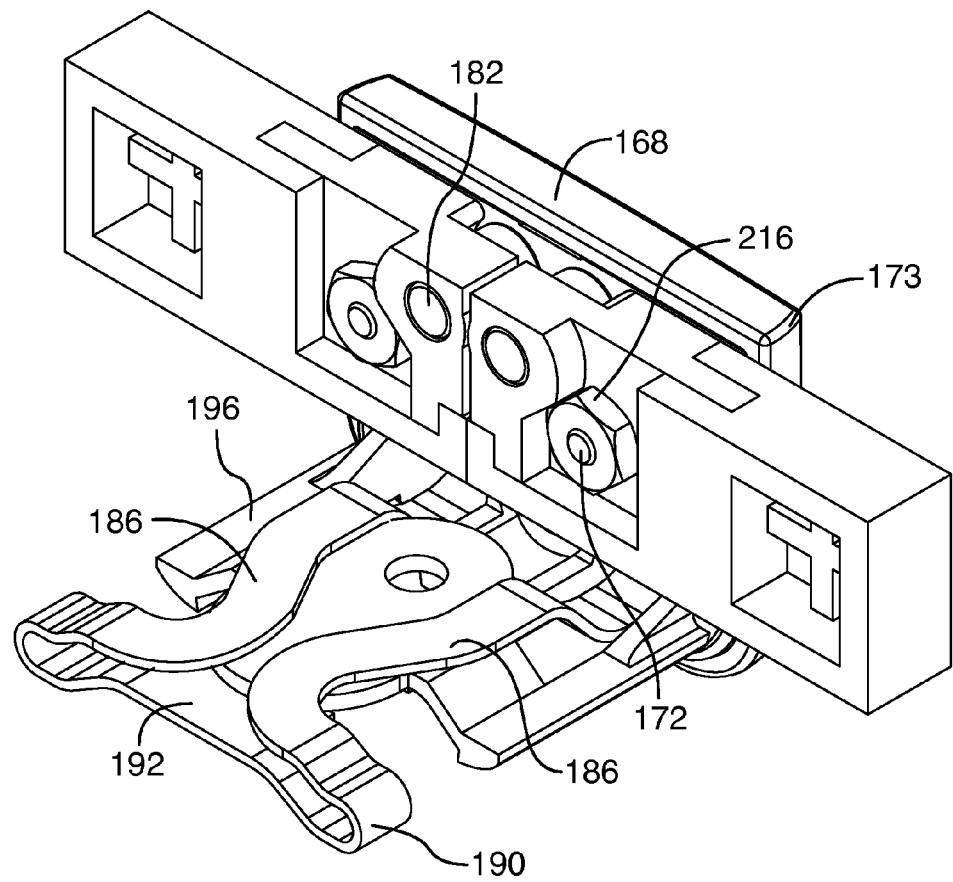
FIG. 8 is a front perspective view of the hinge assembly when the device is in the open configuration.

As can be seen in FIG. 8, when the device 100 is in the fully open position, the upper and lower housings 152, 154 are substantially planar and flush with each other, defining a substantially flat surface or 180° angle. When in the fully open position, the rod 208 sits at the top end of the link pin slot 198, the link pins 182 are provided in the inner fork portion 204 and the pins 172 are returned back to their original position in the intersection portion 206. The biasing member 174 acts to maintain this fully open position. As seen in FIG. 3, when the device 100 is in the fully open position, the keyboard 120 and display 118 can be utilized, although the present device 100 is not limited to the keyboard/display configuration shown in the Figures. For example, the device could include two touch displays rather than a single touch display and a keyboard. Furthermore, the device could further include a navigational input device such as an optical trackpad, joystick, trackball, or the like on either the upper or lower housing 152, 154.

It is contemplated that during the opening and closing of the device 100, the gap 162 defined between the upper and lower housings 152, 154, remains substantially constant. To maintain the constant gap, the distance between the center axis of rotation of both the upper and lower housings 152, 154 increases to provide enough clearance so that the corners of the housings can rotate relative to each other without making contact. Specifically, the frame slots 178a, 178b are shaped to achieve the constant gap—the outer fork portion 202 is arranged at an incline relative to the stem portion 200, and the inner fork portion 204 is arranged in an arced orientation relative to the stem portion. As the link pins 182 move along the arced inner fork portion 204, controlling the sweep of motion of the upper and lower housings 152, 154, the pins 172 move along the inclined outer fork portion 202, causing the center rotation axes of the upper and lower housings to move apart and allow the corners of the upper and lower housings 152, 154 to clear each other. The shape and curvature of the arced inner fork portion 204 is based on several factors, including but not limited to: (a) how close the link pin 182 can be positioned to the corner of the upper/lower housing; (b) the diameter of the link pin 182; and (c) the thickness of the upper/lower housings. Similarly, the angle of incline for the inclined outer fork portion 202 can change based on the thicknesses of the upper and lower housings, but generally is angled such that the corners of the upper and lower housings have enough clearance to rotate apart without contacting each other.

In the present disclosure and as shown in FIGS. 2-3, the upper and lower housings 152, 154 have substantially the same thickness. However, in some implementations, it may be necessary for the upper and lower housings 152, 154 to have different thicknesses (not shown). In such a case, it is still desirable for the gap 162 to appear consistent during the opening and closing of the device. In these instances, the outer faces and sidewalls of the upper and lower housings 152, 154 can be manipulated to give the appearance of a constant gap when the device 100 is opened and closed. Specifically, surface styling and additional protrusions on the upper/lower housings 152, 154 and/or end caps 168 can be provided to visually manage the gap 162. For example, if the upper housing 152 is thicker than the lower housing 154, the end caps 168 can be extended on the thicker side by approximately half the thickness difference between the upper and lower housings 152, 154, thereby minimizing the gap variability that may be present during opening and closing of the device. Accordingly, if the lower housing 154 is 0.3 mm thicker than the upper housing 152, the end caps 168 would be extended 0.15 mm on the lower housing side, thus reducing the appearance of the gap 162.

Figure 9:
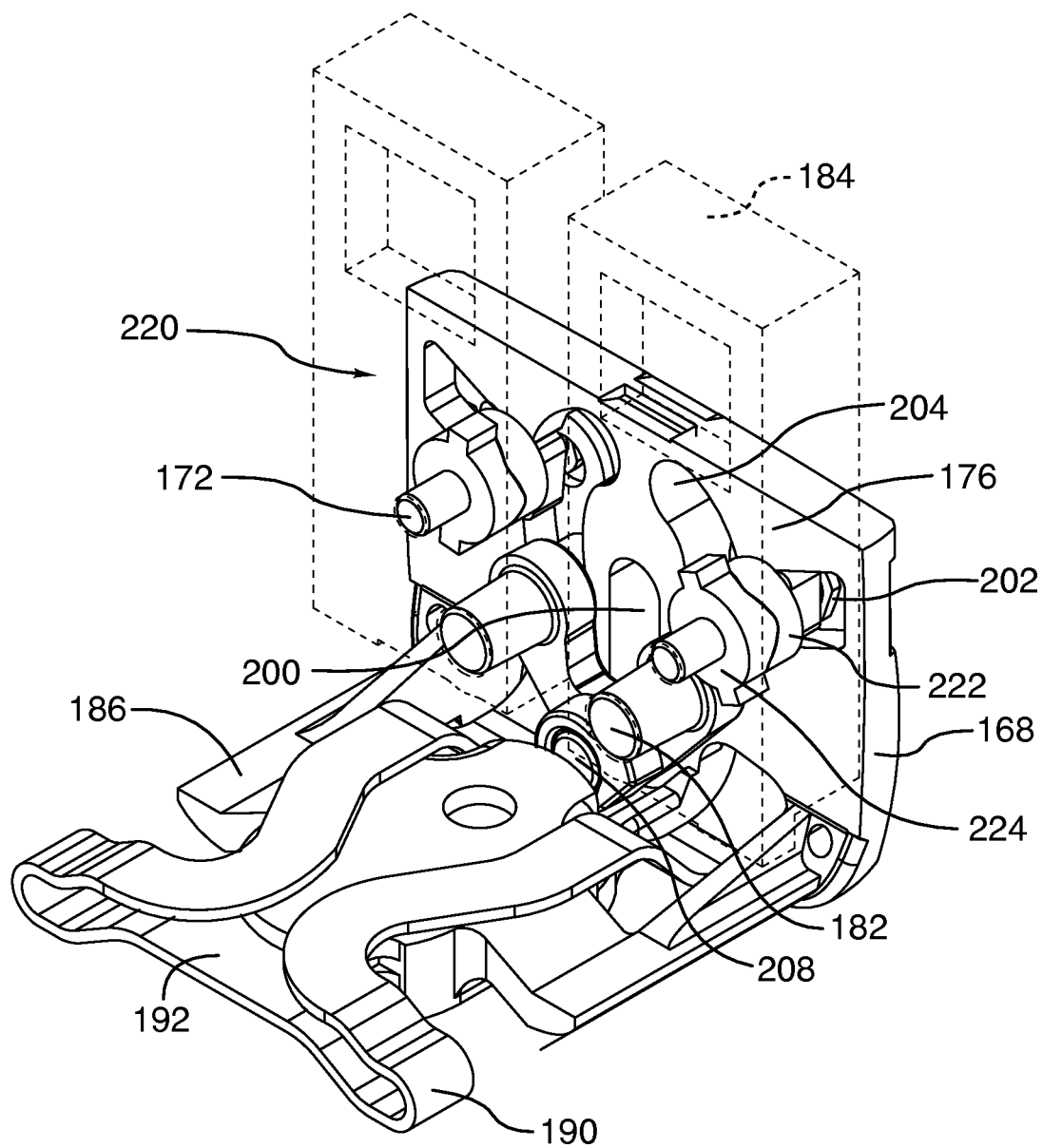
FIG. 9 is a front perspective view of a modified embodiment of the hinge assembly shown in FIG. 4.

Referring next to FIG. 9, to further enhance the ease with which the device 100 can be opened and closed and to maintain the device in either the fully opened or fully closed positions, the link mechanism 166 can further include at least one cam assembly 220 including a cam 222 provided on a corresponding one of the pins 172, and a cam plate 224 configured for retaining the cam. As will be described in further detail, the cam 222 is configured for sliding movement in a corresponding one of the outer fork portions 202 of slots 178a and 178b. Specifically, during opening and closing of the device 100, the corresponding tab 188 of the spring 174 is biased outward, causing the pin 172 (and thus the cam 222) to slide along the outer fork portion. A coil spring (not shown) applies a force to the back of the cam plate 224. Once in the fully opened or closed position, the cam assembly 220 locks, holding the upper and lower housings 152, 154 in their fully open or closed positions and avoiding vibration/movement of the device 100. The cam assembly provides a "snap" sensation when locked, alerting the user to when the device 100 is fully open/closed and maintaining the device in the desired fully open/closed position.

Figure 10:
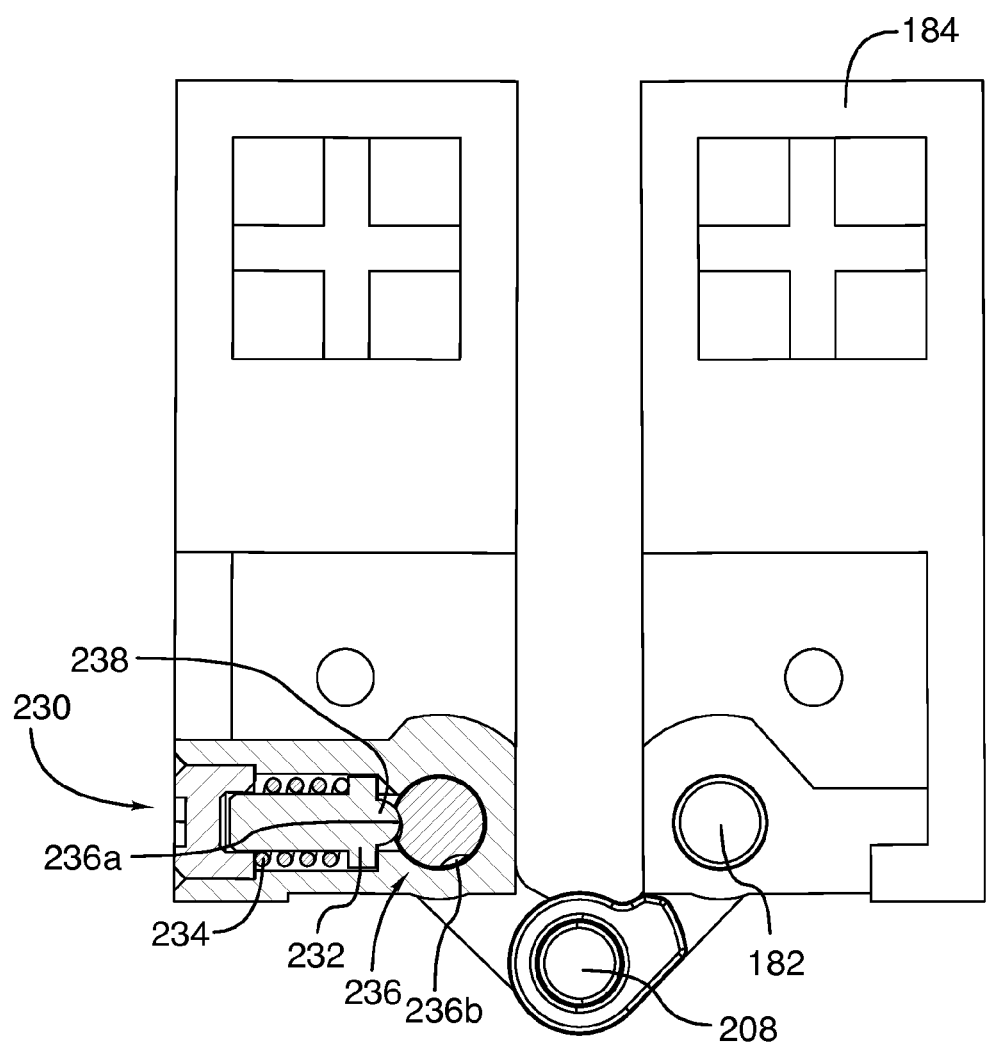
FIG. 10 is a front perspective view of a further modified embodiment of the hinge assembly shown in FIG. 4.

Referring now to FIG. 10, alternatively and instead of the cam assembly 220, the link mechanism 166 can further include at least one plunger assembly 230 including a plunger pin 232 provided in each arm 184, and a plunger biasing member 234 configured for biasing the plunger pin against a corresponding one of the link pins 182. To maintain engagement between the plunger pin 232 and the link pin 182 when the device 100 is in the open and closed configurations, the link pin can include at least one dimple 236 configured for receiving a corresponding detent 238 in the plunger pin 232. Specifically, when the device is in the closed configuration (FIG. 10), the plunger pin detent 238 engages a first dimple 236a in the link pin 182. As the device is opened, the link pin 182 rotates and the detent 238 disengages from the first dimple 236a. When the device 100 reaches the fully opened position, the detent 238 engages a second dimple 236b, snapping or locking the device 100 in the open position. The device 100 is similarly snapped or locked into the closed position when the detent 238 engages the first dimple 236a. The plunger assembly 230 provides a "snap" sensation when locked, alerting the user to when the device 100 is fully open/closed and maintaining the device in the desired fully open/closed position.

Figure 11:
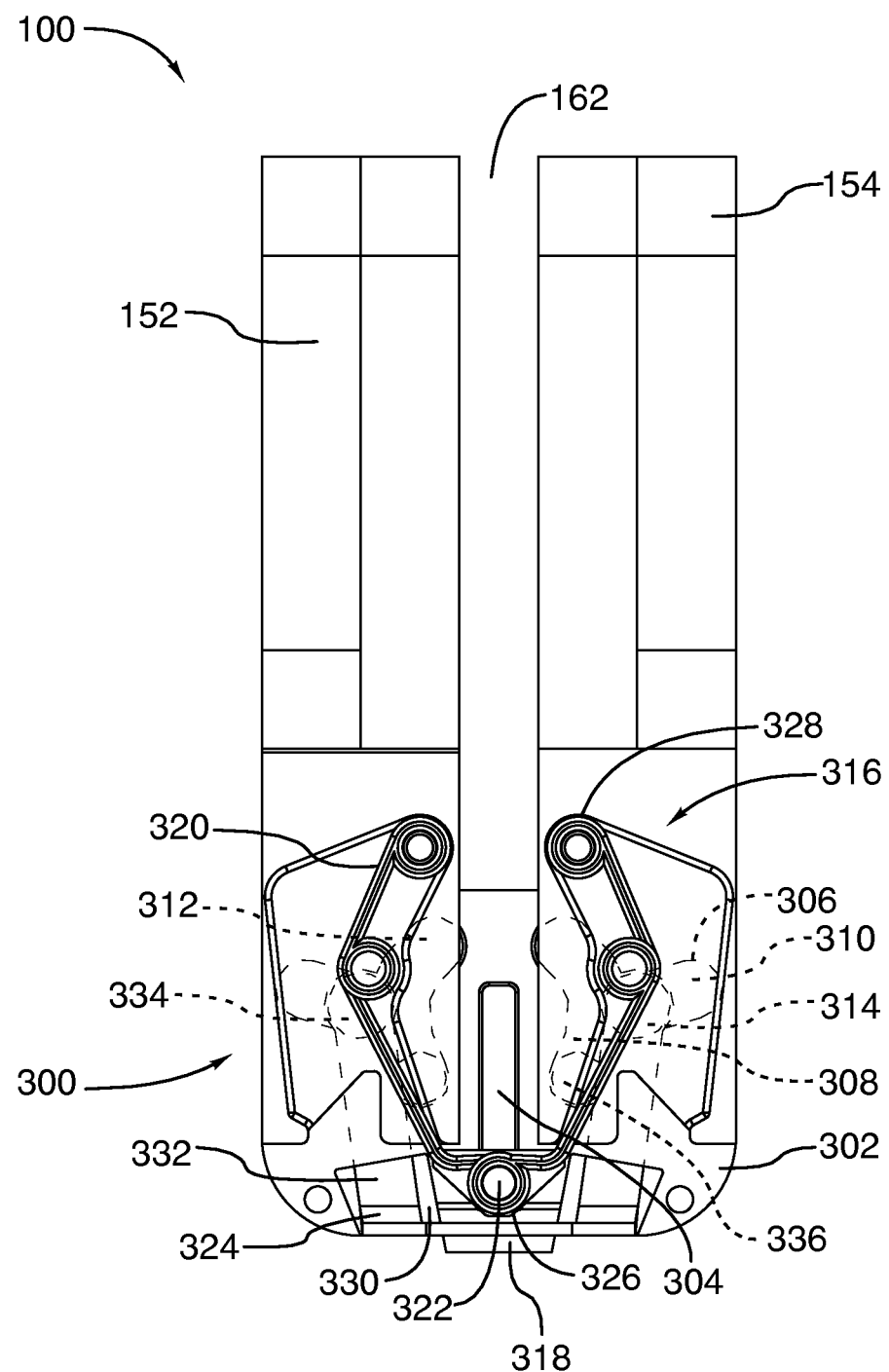
FIG. 11 is a side view of a mobile device in a closed configuration and having a hinge assembly according to an alternate embodiment.
Figure 12:
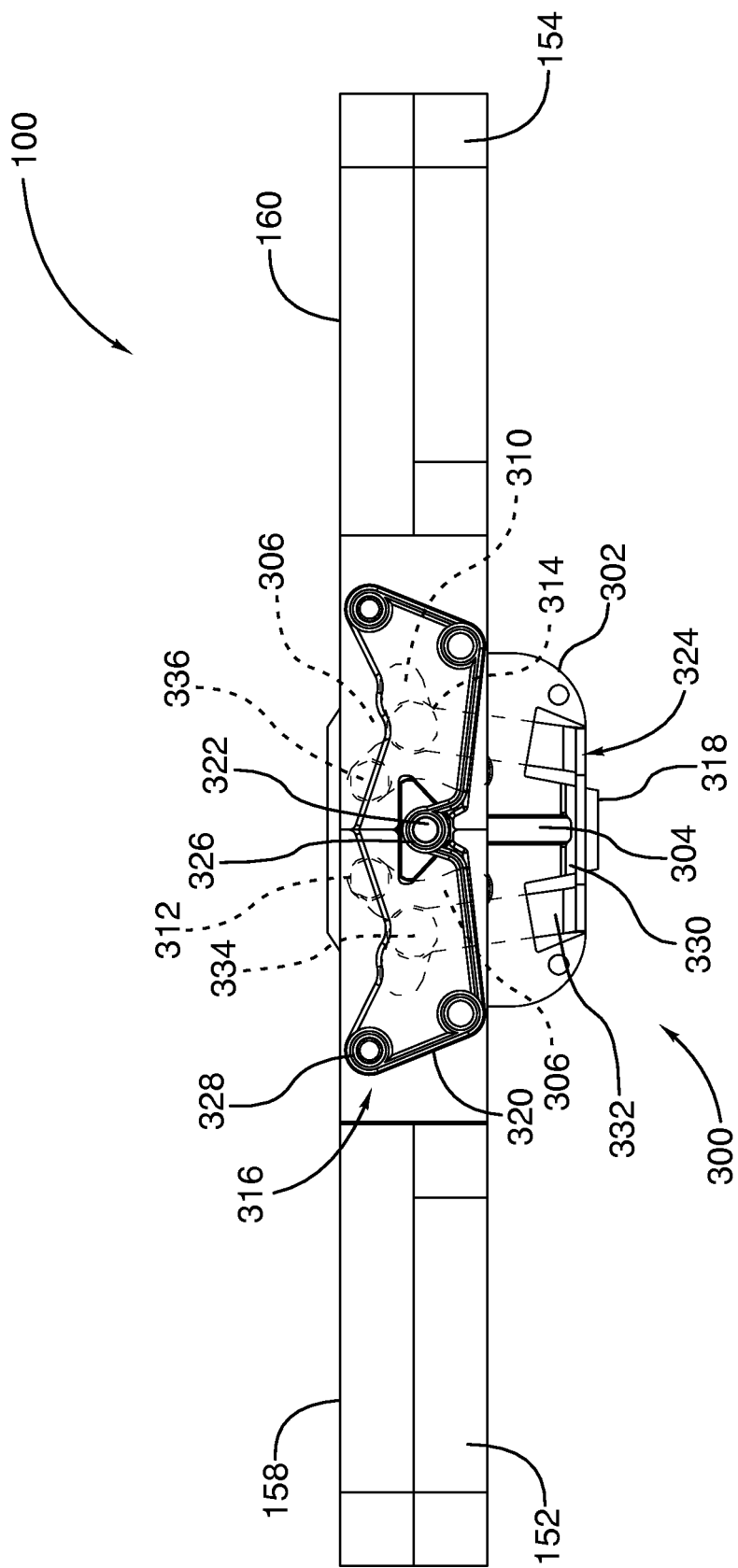
FIG. 12 is a side view of the mobile device of FIG. 11 in an open configuration.

Turning next to FIGS. 11-12, an alternate embodiment of a hinge assembly for the mobile device 100 is provided and is generally designated 300. The bar or hinge assembly 300 includes a pair of end caps 302 each defining a substantially centrally located slot 304 and a pair of spring pin slots 306 (partially shown in phantom lines). Although other configurations may be appropriate, the spring pin slots 306 are preferably substantially Y-shaped (similar to the frame slots 178 in the hinge assembly 156), and include a stem portion 308, an outer fork portion 310, an inner fork portion 312 and an intersection portion 314. The assembly 300 also includes at least one link mechanism 316, and a spine 318 configured for covering the link mechanism and extending between the end caps 302. Similar to the hinge assembly 156, the end caps 302 are arranged substantially perpendicular to the spine 318.

Each link mechanism 316 includes a pair of arms 320, a cylinder 322 configured for engaging the arms, and a plate 324 configured for extending along the length of the spine 318. The arms 320 each include a first end 326 and a second end 328. As can be seen in FIGS. 11-12, the first end 326 is configured for engaging the cylinder 322 and the second end 328 is configured for attachment to one of the upper and lower housings 152, 154. As will be described in further detail below, the arms 326 act as lateral springs during the opening and closing of the device 100. The cylinder 322 is configured for sliding movement within the central slot 304, and also enables movement of the arms 320 during opening and closing of the device 100. The plate 324 includes a base portion 330 arranged substantially parallel to the spine 318 and a pair of tabs 332 (partially shown in phantom lines) extending substantially perpendicular from a corresponding end of the base portion. In the present disclosure, the tabs 332 are integrally formed with the base portion 330—in other words, the plate 324 is a unitary component. As will be described in further detail below, the tabs 332 act as angular springs during the opening and closing of the device 100. Each link mechanism 316 further includes a pair of guide pins 334 configured for securing the tabs 332 to corresponding end caps 302, and a pair of spring pins 336, each spring pin configured for sliding movement within a corresponding one of the spring pin slots 306.

Still referring to FIGS. 11-12, operation of the hinge assembly 300 will now be described in further detail. Referring first to FIG. 11, the device 100 is shown in the closed configuration, and the upper and lower housings 152, 154 are substantially parallel to each other, with the inner faces 158, 160 of the housings facing each other. In the closed configuration, the cylinder 322 is located at the bottom end of the central slot 304, the guide pins 334 are provided substantially at the intersection portion 314 of the corresponding spring pin slot 306, and the spring pins 336 are located at the bottom end of the stem portion 308 of the corresponding spring pin slot.

As the device 100 is opened, the tabs 332 act as angular springs, enabling the upper and lower housings 152, 154 to move away from each other until they reach the fully open position (FIG. 12), such that they form a substantially 180° angle and are substantially planar and flush with each other. Further, during the opening of the device, the cylinder 322 slides upward within the central slot 304, causing the arms 320 to extend outwards in the same direction as their corresponding upper and lower housings 152, 154. As the arms are extended 320, they act as lateral springs, pushing the spring pins 336 upward within their corresponding spring pin slot 306 until the spring pins reach the upper end of the inner fork portion 312. The tabs 332 are extended/biased slightly during the opening of the device 100, causing the guide pins 334 to briefly slide towards the outer fork portion 310 of the corresponding spring pin slot 306, enabling the tabs 332 to bias the device into the opened configuration. As will be understood, as the device 100 is closed, the components described above will return to their original configuration as shown in FIG. 11.

Similar to the hinge assembly 156 depicted in FIGS. 4-10, when the device 100 is in the fully open configuration, a bottom portion of the hinge assembly 300 extends past the corresponding lower surfaces of the upper and lower housings 152, 154, and can serve as a gripping portion for the user when operating the device. Alternatively, the bottom portion can serve as a rest for the device 100 when the device is placed on a solid surface, for example, when the user is viewing a media file such as a video or movie.

Turning now to FIGS. 13-16, a further alternate embodiment for a hinge assembly for the mobile device 100 is provided and generally designated as 400. Each hinge assembly 400 includes a frame member 402 attached to one end of the spine 164 and an end cap 404 configured for covering the respective frame member and providing an outer surface flush with the sidewalls 171 of the housings 152, 154.

Figure 13:
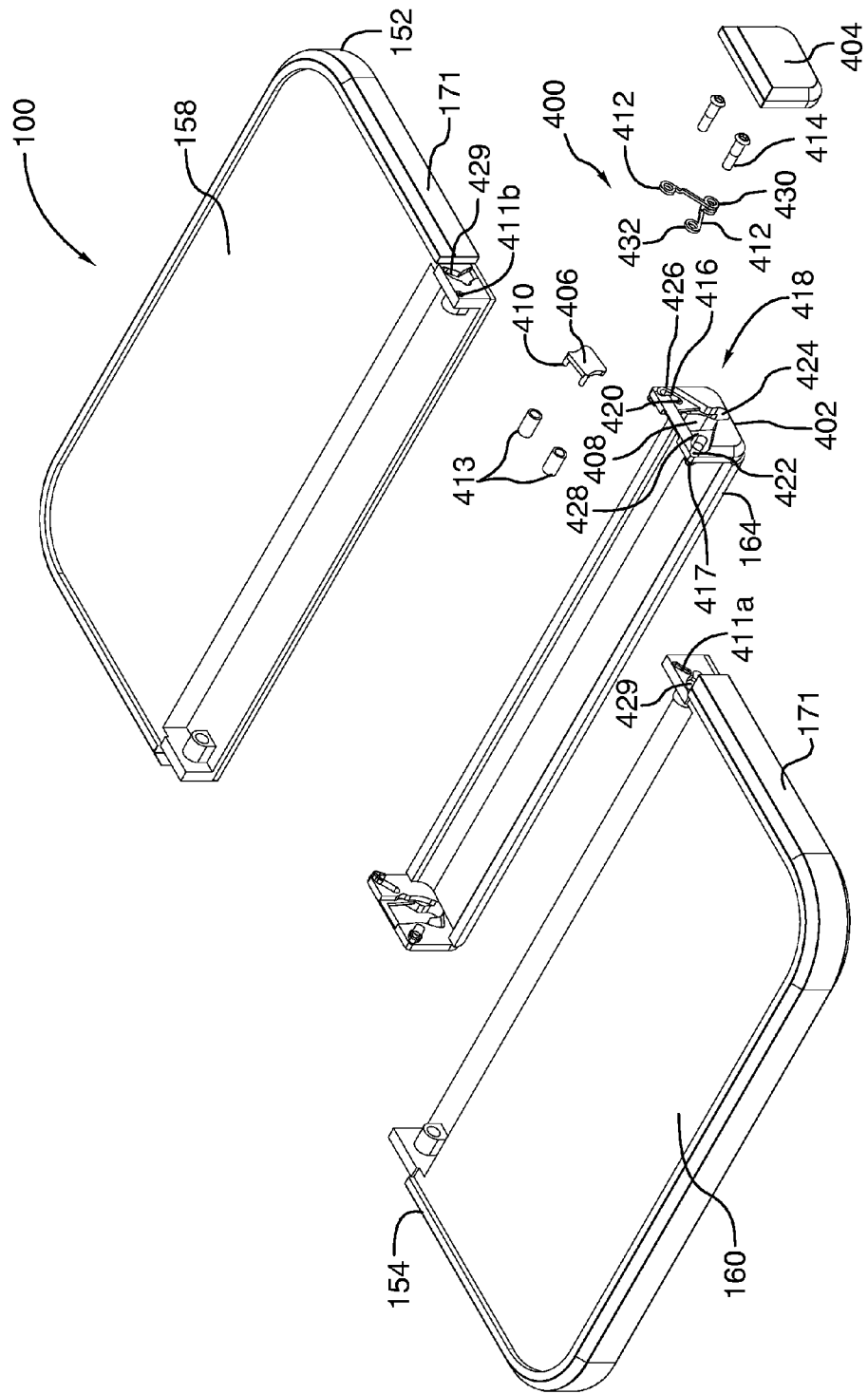
FIG. 13 is an exploded front perspective view of the mobile device having a hinge assembly according to a further alternate embodiment.

As will be described in further detail below, each hinge assembly 400 further includes a cam plate 406 that is configured for movement along a cam plate path 408 defined in the frame member 402. As seen in FIG. 13, the cam plate 406 has a top and a bottom edge, and a pair of concave sidewalls joining the top and bottom edges. Further, the corners of the cam plate 406 are substantially rounded and shaped for engaging and moving along the cam plate path 408 during opening and closing of the device 100. The cam plate 406 includes a pair of rods 410 extending from a back side of the plate, each of which is configured for engaging one of a corresponding rod slot 411$a$ and a corresponding rod hole 411$b$ defined in the upper and lower housings 152, 154, respectively. In the present embodiment, the rod slot 411$a$ is provided in the lower housing 154 and the rod hole 411$b$ is provided in the upper housing 152; however, it is contemplated that the rod slot and rod hole could be located in the upper and lower housings, respectively. To retain the cam plate 406 to the housings 152, 154, a pair of washers 413 are provided for engaging a corresponding one of the rods 410 and securing it to the respective housing. As seen in FIG. 13, the rods 410 are generally located at opposing top corners of the cam plate 406, and are generally cylindrical in shape.

Each hinge assembly 400 further includes a pair of biasing members 412 secured to the frame member 402 by a pair of pins 414 and configured for biasing the upper and lower housings 152, 154 between the closed and open configurations. More specifically, the frame member 402 defines a pair of pin slots 416 that are each configured for receiving a corresponding one of the pins 414, and a generally Y-shaped channel 418 configured for receiving the biasing members 412. The pin slots 416 are generally arranged at an incline relative to the spine member 164, and include an inner end 420 and an outer end 422. The pin slots 416 are defined within the Y-shaped channel 418, which includes a stem portion 424, a first fork portion 426 and a second fork portion 428. The pins 414 extend through the pin slots 416 and further engage corresponding guide slots 429 provided in each of the upper and lower housings 152, 154, for retaining the frame member 402 to the device 100. The frame member 402 further includes a pair of cam lobes 417 extending from a back side of the frame member near the outer end 422 of the corresponding pin slot 416 and configured for engaging a corresponding one of the guide slots 429. As will be described in further detail below, the cam lobes 417 are fixed to the frame member 402, such that as the device 100 is opened and closed, the guide slots 429 move over the cam lobes, enabling the cam lobes to control the movement of the upper and lower housings 152, 154 during opening and closing of the device. It is contemplated that the cam lobes 417 are integrally formed with the frame member 402, however it is appreciated that the cam lobes could also be a separate component attached to the frame member by welding or a high strength adhesive.

Figure 14:
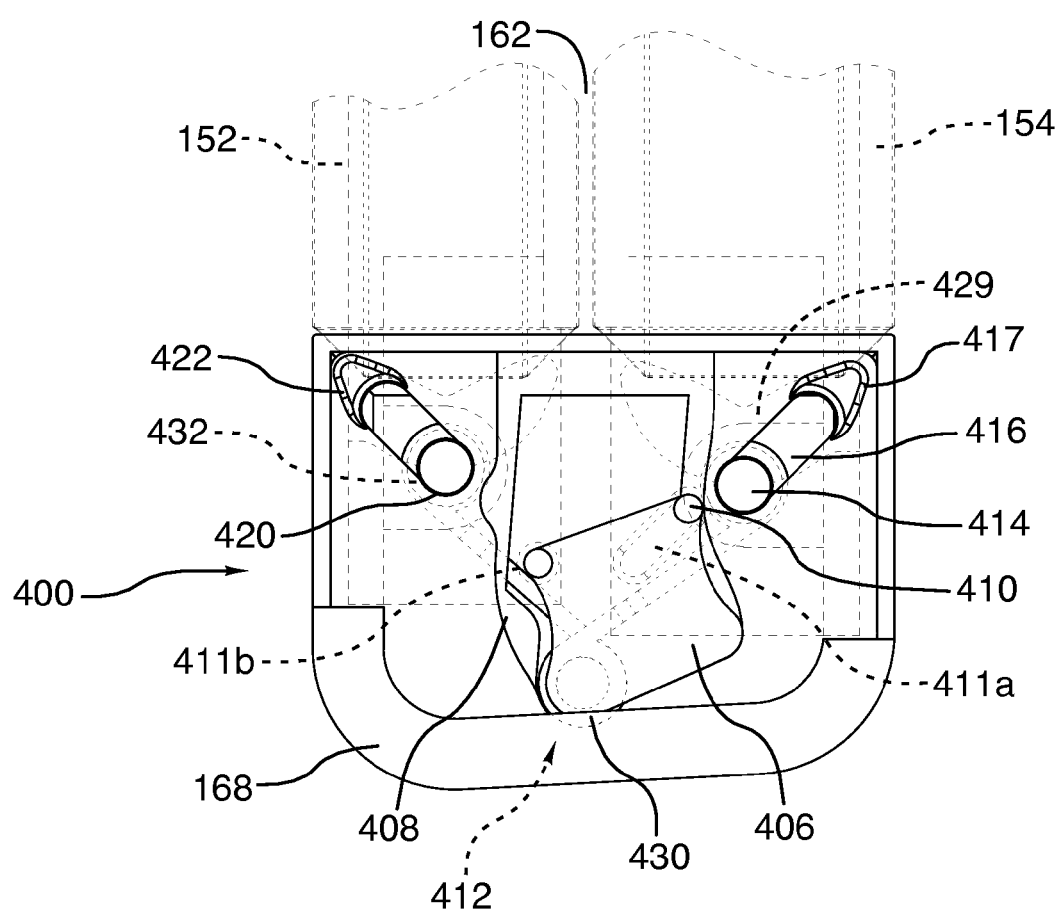
FIG. 14 is a side view of the mobile device in FIG. 13 in a closed configuration.
Figure 15:
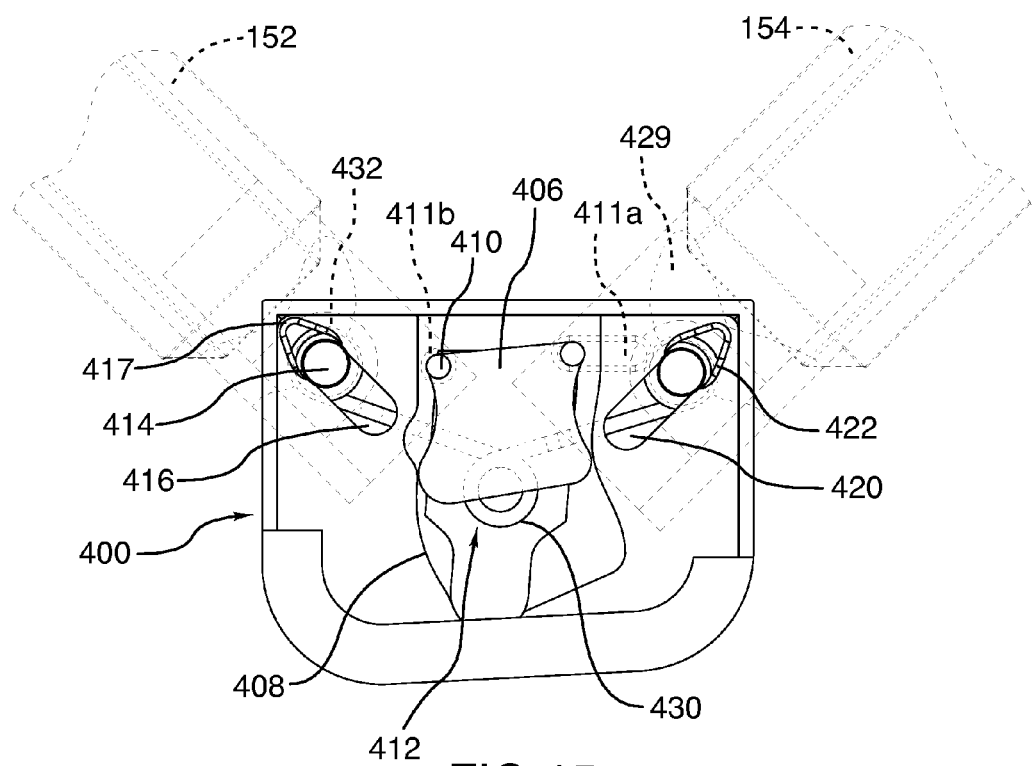
FIG. 15 is a side view of the mobile device of FIG. 13 in a partially open configuration.

Operation of the hinge assembly 400 while the device 100 moves from the closed configuration to the open configuration will now be described in greater detail. As seen in FIG. 14, when the device is in the closed configuration, the inner faces 158, 160 of the upper and lower housings 152, 154 are substantially parallel and adjacent to each other, and the cam plate 406 is provided at or near a bottom/lower end of the cam plate path 408. In addition, while in the closed configuration, the biasing member 412 is at a rest or start position, such that a first end 430 of the biasing member 412 is located at or near a bottom end of the stem portion 424 of the generally Y-shaped channel 418, and a second end 432 of the biasing member is located at or near the inner end 420 of the pin slot 416. Accordingly, the pins 414 are also located at the inner end 420 of their respective pin slots 416, and the cam lobes 417 are provided at an outer end of their corresponding guide slots 429.

As the device begins to open (FIG. 15), the guide slots 429 move over their corresponding cam lobes 417 from the outer end of the guide slot to a central portion thereof, causing the first end 430 of each of the biasing members 412 to move up along the stem portion 424 of the channel 418, and driving the second end 432 of each biasing member (and as a result the respective pin 414) from the inner end 420 of the corresponding pin slot 416 towards the outer end 422. This movement drives the upper and lower housings 152, 154 away from each other, and causes the cam plate 406 to travel upward along the cam plate path 408. Specifically, because each of the rods 410 is secured to one of the upper and lower housings 152, 154, as the housings move away from each other, one of the rods 410 in each cam plate 406 travels within its respective rod slot 411a, enabling movement of the cam plates 406 along their respective cam plate paths 408.

The cam lobes 417 serve as the primary controller during the opening and closing of the device, and help to drive the upper and lower housings 152, 154 towards the fully open and fully closed positions. The cam plates 406 are configured for adding stability to the device 100 during opening and closing. More specifically, as the device is being opened, when the upper and lower housings 152, 154 define a substantially 90° angle relative to each other, there is a tendency for the device to want to close (i.e., cause the upper and lower housings to "flip-flop" or move back toward each other). The addition of the cam plate 406 helps to prevent this tendency, and enables a smooth transition from the 90° angle to the fully open position.

Figure 16:
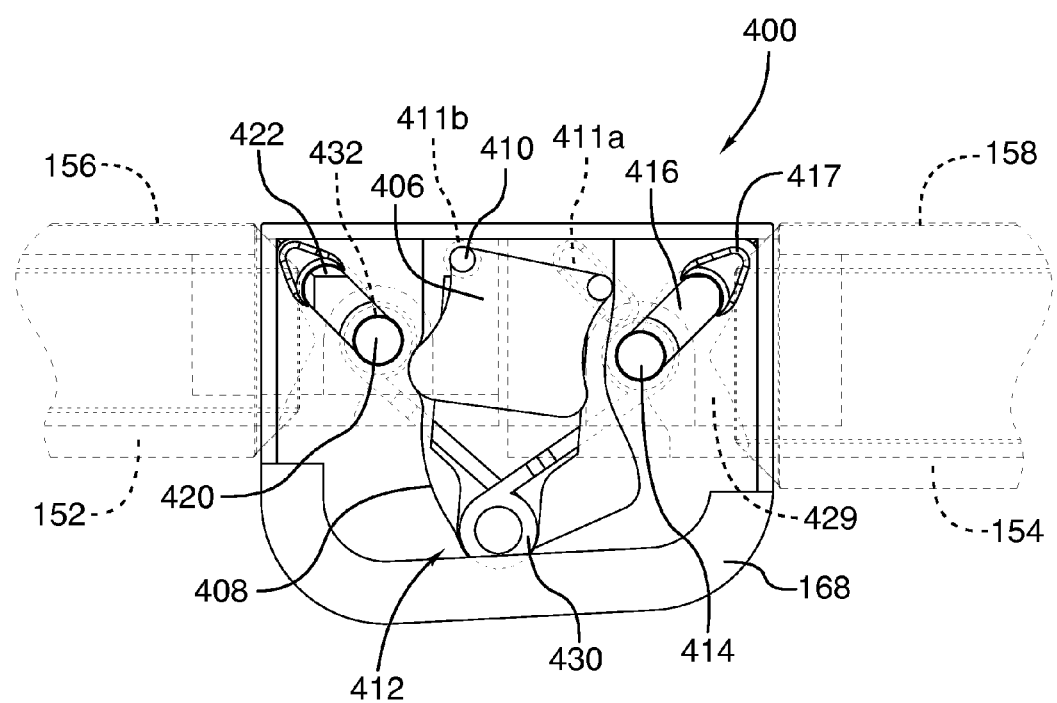
FIG. 16 is a side view of the mobile device of FIG. 13 in a fully open configuration.

When the device 100 is in the fully open configuration, as seen in FIG. 16, the inner faces 158, 160 of the upper and lower housings 152, 154, respectively, are generally planar and define a substantially 180° angle. With respect to the hinge assembly 400, in the fully open configuration, the biasing members 412 have moved back to their rest or start position, such that the second end 432 and corresponding pin 416 reside at the inner end 420 of the pin slot 416, and the first end 430 is provided at or near the bottom end of the stem portion 424. In addition, when the device is in the fully open configuration, the cam plate 406 resides at or near a top end of the cam plate path 408, and the cam lobes 417 are located at an inner end of their corresponding guide slots 429. The biasing members 412 are configured for maintaining the fully open position of the device 100.

Similar to the hinge assemblies 156, 300 described above, with the hinge assembly 400, the gap 162 defined between the upper and lower housings 152, 154 remains substantially constant regardless of whether the device 100 is closed, partially opened or fully opened.

The present hinge assemblies 156, 300, 400 are configured for providing a clamshell-style device that when in the open configuration, results in upper and lower housings that are substantially planar and flush with each other and that define a substantially 180° angle relative to each other. As described in detail above, the present device 100 is configured such that when the device is in the open configuration, the upper and lower housings 152, 154 do not overlap each other, and therefore the size of the input devices (i.e., keyboards, display screens, touch displays) can be of larger size without increasing the overall size of the device. This is in contrast to some conventional clamshell-type devices, where one of the input devices is limited in size due to one of the housings overlapping the other when the device is in the open configuration. Further, in the present hinge assemblies 156, 300, 400 the gap 162 defined between the upper and lower housings 152, 154 is minimized relative to some conventional clamshell mobile devices and remains substantially constant during opening and closing of the device. Accordingly, a single input device (such as a touch sensitive display) could extend from one of the housings across the hinge assembly and further onto the other of the housings, thereby providing a single, large display area without increasing the overall size of the device. The present hinge assemblies 156, 300, 400 are also hidden from view by their end caps and spines, thus providing an aesthetically pleasing and streamlined appearance to the device.

While a particular embodiment of the present mobile device has been described herein, it will be appreciated by those skilled in the art that changes and modifications may be made thereto without departing from the disclosure in its broadest aspects and as set forth below.

The invention claimed is:

1. A mobile device comprising:
   a first housing comprising a pair of opposing sidewalls;
   a second housing comprising a pair of opposing sidewalls; and
   a hinge assembly rotatably coupling the first housing to the second housing and enabling movement of the device between an open configuration and a closed configuration, the hinge assembly having a pair of opposing end caps that are substantially flush with and adjacent to the pairs of opposing sidewalls when the device is in both the open and closed configurations;
   wherein when the device is in the open configuration, an inner face of the first housing is planar with and adjacent to an inner face of the second housing, the hinge assembly includes a spine defining a channel and at least one link mechanism, and the pair of end caps are provided on either end of the spine.

2. The mobile device of claim 1 wherein in the open configuration, the first housing inner face is arranged at 180° relative to the second housing inner face.

3. The mobile device of claim 1 further including at least one input device provided on the first and second housings.

4. The mobile device of claim 3 wherein the input device includes a display provided on the first housing inner face.

5. The mobile device of claim 3 wherein the input device includes a keyboard provided on the second housing inner face.

6. The mobile device of claim 1 wherein the first housing includes an outer face opposite the first housing inner face and having a display.

7. The mobile device of claim 1 wherein each link mechanism includes:
   at least one pin;
   a biasing member;

a frame defining at least one slot configured for receiving a corresponding pin;

at least one link, each link including at least one link pin configured for engaging and moving along a corresponding one of the slots when the device is moved between the closed and open configurations; and at least one arm, each arm configured for receiving a corresponding link;

wherein the link mechanism is configured for enabling movement of the device between the closed and open configurations.

8. The mobile device of claim 7 wherein the biasing member is a spring configured for engaging the frame.

9. The mobile device of claim 8 wherein the spring includes:

a base portion; and a tab portion arranged substantially perpendicular to said base portion and including a pair of tabs each defining a pinhole for receiving a corresponding one of the pins.

10. The mobile device of claim 9 wherein said base portion is integrally formed with said tab portion, said base portion including a mounting surface configured for being received in said channel.

11. The mobile device of claim 7 wherein the link mechanism further includes at least one cam assembly comprising:

a cam provided on a corresponding one of the pins and configured for sliding movement in a corresponding one of the slots; and a cam plate configured for retaining said cam.

12. The mobile device of claim 7 wherein said link mechanism further includes at least one plunger assembly comprising:

a plunger pin provided in each arm; and a biasing member configured for biasing said plunger pin against a corresponding one of the link pins.

13. The mobile device of claim 12 wherein said link pin includes at least one dimple configured for receiving a corresponding detent in said plunger pin.

14. The mobile device of claim 1 wherein the pair of end caps each define at least one slot and wherein said hinge assembly includes:

at least one link mechanism;

a spine configured for covering said link mechanism and extending between said end caps;

a cylinder configured for engaging said link mechanism and extending along a length of said spine; and a plate member configured for engaging said link mechanism and including a base extending along the length of said spine.

15. The mobile device of claim 14 wherein each said link mechanism includes:

a pair of arms, each of said arms including a first end and a second end, the first end configured for engaging said cylinder, the second end configured for sliding movement within a corresponding one of said slots;

a pair of tabs extending substantially perpendicular from a corresponding end of said plate; and a pair of guide pins, each guide pin configured for engaging a corresponding one of the pair of tabs and for moving within a corresponding one of the slots.

16. The mobile device of claim 1 further including a gap defined between said first and second housings and having a thickness, said thickness remaining substantially constant whether said device is in the open or the closed configuration.

17. The mobile device of claim 1 wherein the hinge assembly includes:

a frame member defining a cam plate path and a pair of pin slots;

a cam plate configured for traveling along said cam plate path during opening and closing of the device;

a pair of biasing members having a first end and a second end and configured for biasing the device between the open and closed configurations;

a pair of pins, each pin configured for engaging the second end of a corresponding one of the biasing members and for being received within a corresponding one of said pin slots;

a guide slot defined in each of the upper and lower housings; and a pair of cam lobes each extending from a back side of said frame member and configured for engaging a corresponding one of the guide slots, the guide slots configured for moving over the cam lobes during opening and closing of the device.

18. A mobile device comprising:

a first housing comprising a pair of opposing sidewalls;

a second housing comprising a pair of opposing sidewalls; and a hinge assembly rotatably coupling the first housing to the second housing and enabling movement of the device between an open configuration and a closed configuration, the hinge assembly having a pair of opposing end caps that are substantially flush with and adjacent to the pairs of opposing sidewalls when the device is in both the open and closed configurations, the hinge assembly further including at least one link mechanism comprising:

at least one pin;

a biasing member;

a frame defining at least one slot configured for receiving a corresponding one of the pins;

at least one link, each link including at least one link pin configured for engaging and moving along a corresponding one of the slots when the device is moved between the closed and open configurations; and at least one arm, each arm configured for receiving a corresponding one of the links;

wherein when the device is in the open configuration, the first housing is planar with the second housing.

19. The mobile device of claim 17 wherein the input device includes a display provided on one of said first and said second housing; and a keyboard provided on the other of said first and said second housing.

* * * * *